(12) United States Patent
AlDarazi

(10) Patent No.: US 11,595,375 B2
(45) Date of Patent: Feb. 28, 2023

(54) SINGLE SIGN-ON FOR TOKEN-BASED AND WEB-BASED APPLICATIONS

(71) Applicant: Saudi Arabian Oil Company, Dhahran (SA)

(72) Inventor: Yassir AlDarazi, Safwa (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 176 days.

(21) Appl. No.: 16/848,414

(22) Filed: Apr. 14, 2020

(65) Prior Publication Data

US 2021/0320911 A1    Oct. 14, 2021

(51) Int. Cl.
| | |
|---|---|
| H04L 29/06 | (2006.01) |
| H04L 9/40 | (2022.01) |
| H04L 9/06 | (2006.01) |
| H04L 9/32 | (2006.01) |
| H04L 67/02 | (2022.01) |

(52) U.S. Cl.
CPC ........ H04L 63/0815 (2013.01); H04L 9/0643 (2013.01); H04L 9/3213 (2013.01); H04L 63/02 (2013.01); H04L 63/108 (2013.01); H04L 67/02 (2013.01)

(58) Field of Classification Search
None
See application file for complete search history.

(56) References Cited

U.S. PATENT DOCUMENTS

| | | | |
|---|---|---|---|
| 7,082,532 B1* | 7/2006 | Vick | H04L 63/0815 |
| | | | 713/157 |
| 7,992,000 B2 | 8/2011 | Zhou | |
| 9,407,725 B2* | 8/2016 | Fausak | H04L 67/133 |
| 9,491,157 B1* | 11/2016 | Amdahl | H04L 67/1001 |
| 2001/0045451 A1* | 11/2001 | Tan | G06Q 20/12 |
| | | | 235/375 |
| 2004/0010724 A1* | 1/2004 | Brown | H04L 63/0861 |
| | | | 713/186 |
| 2006/0123234 A1* | 6/2006 | Schmidt | H04L 63/0209 |
| | | | 713/168 |

(Continued)

FOREIGN PATENT DOCUMENTS

| | | | |
|---|---|---|---|
| CN | 107819610 A | * | 3/2018 |
| WO | WO-2008/053279 A1 | | 5/2008 |

(Continued)

OTHER PUBLICATIONS

International Search Report for PCT/IB2020/056529, 4 pages (dated Nov. 16, 2020).

(Continued)

*Primary Examiner* — Andrew J Steinle
(74) *Attorney, Agent, or Firm* — Osha Bergman Watanabe & Burton LLP

(57) ABSTRACT

A method of authenticating a user includes: logging into a first system that includes a token-based authentication system (TBAS); creating, at the TBAS, a cookie based on a token from the TBAS; requesting access, by the user, to a second system that includes at least one windows-hosted web application (WHWA); and decoding and validating the token, thereby granting the user access to the second system based only on the user logging into the first system.

10 Claims, 6 Drawing Sheets

(56) References Cited

U.S. PATENT DOCUMENTS

| | | | | |
|---|---|---|---|---|
| 2006/0195877 | A1* | 8/2006 | Bentz | G06Q 30/00 |
| | | | | 725/112 |
| 2016/0255067 | A1* | 9/2016 | Keromytis | H04L 63/08 |
| | | | | 726/7 |
| 2017/0316405 | A1* | 11/2017 | Lonni | G06Q 20/3674 |
| 2018/0139205 | A1* | 5/2018 | Devaney | H04L 63/0876 |
| 2018/0288150 | A1* | 10/2018 | Wang | G06F 11/1464 |
| 2019/0171584 | A1* | 6/2019 | Kan | G06F 3/0661 |
| 2020/0106766 | A1* | 4/2020 | Suraparaju | H04L 67/563 |

FOREIGN PATENT DOCUMENTS

| | | |
|---|---|---|
| WO | WO-2008/098710 A1 | 8/2008 |
| WO | WO-2010/000588 A1 | 1/2010 |
| WO | WO-2011/108004 A1 | 9/2011 |
| WO | WO-2012/173539 A1 | 12/2012 |
| WO | WO-2016/022058 A1 | 2/2016 |
| WO | WO-2019/036337 A1 | 2/2019 |
| WO | WO-2021/209804 A1 | 10/2021 |

OTHER PUBLICATIONS

Written Opinion for PCT/IB2020/056529, 8 pages (dated Nov. 16, 2020).

* cited by examiner

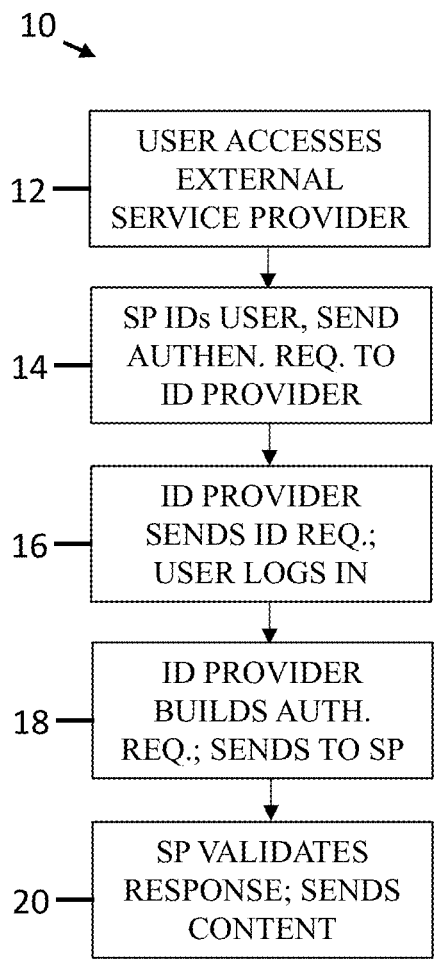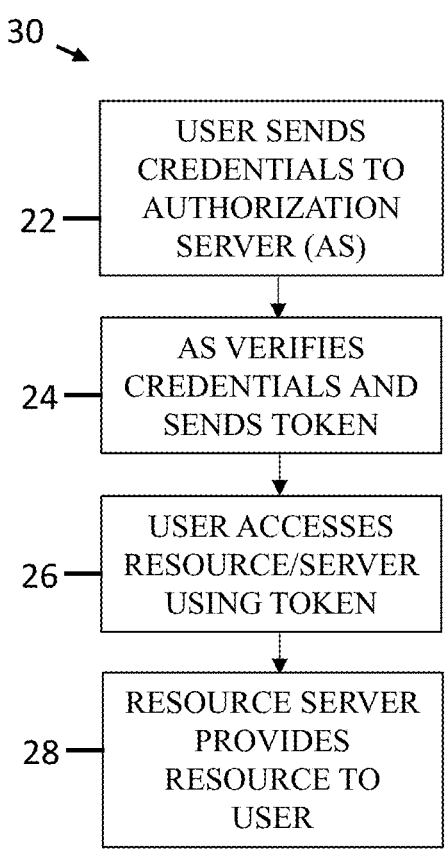
FIG. 1
FIG. 2

SINGLE SIGN-ON FOR TOKEN-BASED AND WEB-BASED APPLICATIONS

FIELD

The subject matter described herein relates to systems and methods for accessing multiple platform types using single-sign on authentication.

BACKGROUND

Single sign-on (SSO) authentication is currently used to allow users to enter sign-on credentials a single time, and then to subsequently gain authentication and/or access to multiple windows-based applications or host sites without having to re-enter their log-in credentials (for example, user name and password). Using single-sign on can save time and can reduce or eliminate the need for users to keep track of multiple passwords.

One drawback of single-sign on is that if a user loses the ability to access single sign-on, the user may lose access to several applications and web-based software. In addition, single sign-on may work only for windows-based applications and may not be accessible or applicable to other platform types (for example, non-windows-based applications). Currently, users logged into SAP applications, for example, cannot be verified from windows-hosted applications. For example, if a user logs into SAP payroll applications and the SAP system (or other non-windows based systems) tries to pull data from a windows hosted application, the program is unable to pull the SSO authentication credentials. Windows-hosted applications cannot tell the identity of the non-windows based user as the non-windows-based user has only logged into SAP, and not a windows-based application. Thus, the user has to log into the windows-hosted application manually, after having logged into the SAP application (or other non-windows based application) manually. The order in which the user logs in (that is, SAP application first or window-based application first) does not solve this problem as the SSO authentication credentials are not portable across platforms.

SUMMARY OF THE INVENTION

The present disclosed embodiments include systems and methods for single sign-on authentication across multiple platform types, for example token-based authentication and web-based applications. The present disclosed embodiments may be used to programmatically authenticate users who logged in to token-based authentication systems (such as SAP) in other platforms such as web-based applications using windows-based authentications (such as .Net web applications) that are running on a windows server.

The present disclosed embodiments may be used to build a custom authenticator to take tokens generated by token-based authentication systems and decode them to get a user ID, and then a windows-based authentication system may use that user ID as the logged in user.

In one aspect, the present invention is directed to a method of authenticating a user including: logging into a first system including a token-based authentication system (TBAS); creating, at the TBAS, a cookie based on a token from the TBAS; requesting access, by the user, to a second system, including at least one windows-hosted web application (WHWA); and decoding and validating the token, thereby granting access to the second system based only on the user logging into the first system.

In some embodiments, the first system and/or the second system includes a SAP application.

In some embodiments, the WHWA sends the cookie to a custom-built web application hosted on the second system.

In some embodiments, decoding and validating the token is performed by the custom-built web application, and the custom-built web application saves the token as a text file.

In some embodiments, the WHWA reads the text file to determine an identity of the user.

In some embodiments, the WHWA sets an identity of the request resulting from requesting access, by the user, to the second system, to the identity of the user.

In some embodiments, the method includes determining if a connection between the TBAS and the WHWA is using a service account.

In some embodiments, determining if a connection between the TBAS and the WHWA is using a service account further includes querying a configuration manager for service account credentials.

In some embodiments, decoding and validating the token includes creating at least one hash file name.

In some embodiments, the method includes invalidating the token after the expiration of a predetermined time-out period.

In another aspect, the present invention is directed to a system including: an intranet; at least one extranet portal forming an interface between the intranet and an extranet; and at least one application-specific host environment within the intranet. A user accesses at least one SAP application hosted within the application-specific host environment and at least one windows-hosted web application (WHWA) hosted within the extranet via a single login.

In some embodiments, the system includes at least one web dispatcher communicatively coupled between the extranet and the extranet portal. The web dispatcher communicates with the extranet portal via a hypertext transfer protocol secure (HTTPS) connection.

In some embodiments, the system includes at least one reverse proxy NetScaler communicatively coupled between the web dispatcher and the extranet.

In some embodiments, the system includes a first firewall and a first demilitarized zone.

In some embodiments, the system includes: a second firewall disposed between the reverse proxy NetScaler and the web dispatcher; a third firewall disposed between the web dispatcher and the extranet portal; and a second demilitarized zone. The reverse proxy NetScaler is disposed within the first demilitarized zone, and the web dispatcher is disposed within the second demilitarized zone.

In some embodiments, the system includes at least one application-specific server disposed within the application-specific host environment.

In some embodiments, the system includes at least one web farm; and multiple windows internet information services (IIS) web servers hosted on the web farm. The application-specific server is coupled to the web farm via an HTTPS connection.

In some embodiments, the system includes at least one of an active directory authentication server, a SAP basis server, and an Oracle database.

In some embodiments, the system includes at least one exchange server communicatively coupled via a first simple mail transfer protocol (SMTP) connection to the application-specific host environment; and at least one client communicatively coupled to the exchange server via a second simple mail transfer protocol (SMTP) connection, and communicatively coupled to the application-specific host environment via an HTTPS connection.

In some embodiments, the system includes at least one connection between components of the system includes a secure sockets layer (SSL) connection, a transport layer security (TLS) connection, and/or a new technology LAN manager (NTLM) connection.

In another aspect, the present invention is directed to a method of authenticating a user including: logging into a first system, including a token-based authentication system (TBAS); creating, at the TBAS, a cookie based on a token from the TBAS, the cookie including one or more parameters relating to an authenticated environment of the TBAS; upon requesting access to a second system by the user, sending the cookie to the second system; and using a custom-built windows application to decode and validate the cookie if the connection between the first system and the second system uses a service account.

In some embodiments, the second system includes at least one windows-hosted web application (WHWA).

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of the prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which:

FIG. 1 illustrates an exemplary single sign-on method;

FIG. 2 illustrates an exemplary token-based authentication method, according to aspects of the present disclosed embodiments;

DESCRIPTION OF CERTAIN EMBODIMENTS OF THE INVENTION

Figure 3:
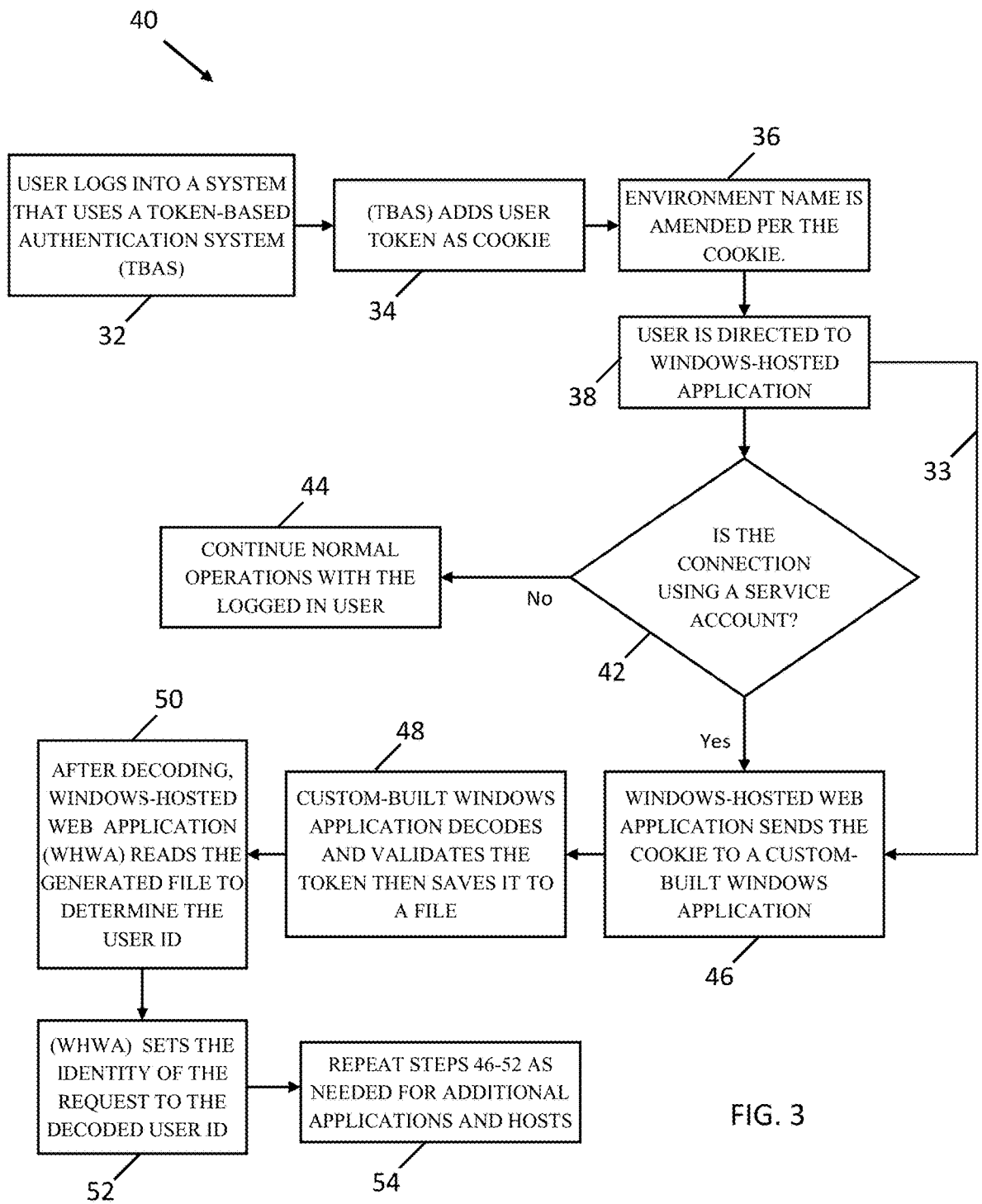
FIG. 3 illustrates a single sign-on method for token-based and web-based applications, according to aspects of the present disclosed embodiments.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

The present disclosed embodiments include methods and systems that include a custom-built windows application that utilizes SAP components that are usually used to authenticate users on a windows machine. The custom-built windows application may then be called by a web application to retrieve the logged-in user credentials and send them to the web application that is hosted on a windows server. This may be accomplished "behind the scenes" without the user's involvement. As such, the user only needs to log into an SAP-hosted application. When needed, the SAP-hosted applications send the authentication token to the windows-hosted application without requiring any intervention by the user.

FIG. 1 illustrates an exemplary single sign-on method 10. At step 12, method 10 may include a user accessing an external service provider (SP, for example, a website or a web-based application). At step 14, method 10 may include the service provider identifying the user and sending an authentication request directly to an identity provider (ID). At step 16, method 10 may include the identity provider sending an identity request to the user and the user subsequently entering login credentials (for example, user ID/username and password). At step 18, method 10 may include the identity provider building an authentication request based on the user's login credentials (and including a digital signature from the identity provider) that validates the user's credentials. As step 18, method 10 may also include sending the authentication request to the service provider. At step 20, method 10 may include the service provider validating the authentication request and subsequently providing the underlying web-based service (or content) to the user. As the user requests subsequent web-based content (for example, from other websites) and/or services, method 10 may begin again, this time starting with step 16 and validating the user to the new service provider without requiring the user to login again. As such, using the exemplary single sign-in method 10 of FIG. 1, the user may gain access to multiple web-based services and content after only having to login a single time.

FIG. 2 illustrates an exemplary token-based authentication method 30. At step 22, method 30 may include a user sending credentials (such as login credentials) to an authorization server (AS). The user may send the credentials via a client such as a tablet, personal desktop computer (PC), and/or smart phone, as well as other electronic devices. At step 24, method 30 may include the authorization server verifying the user credentials and sending a token back to the user. At step 26, method 30 may include the user accessing a resource or server (for example, web-based content and/or service(s)) using the token. At step 28, method 30 may include the resource or server providing the resource (and/or web-based service or content) to the user. For future service requests by the user for other resources and/or services, the token may be reused and/or a new token may be required. Regarding both the single sign-on method (or protocol) 10 of FIG. 1 and the token-based authentication method (or protocol) 30 of FIG. 2, the authentication credentials and/or tokens may not be portable across different system types that include different platforms. For example, the tokens and single sign-on credentials may be usable only for web-based applications and/or windows-based applications, but not for SAP applications, Unix applications, Linux applications, and/or other non-windows-based or non-web-based applications.

FIG. 3 illustrates a method 40 of using single sign-on across platforms, according to aspects of the present disclosed embodiments. At step 32, method 40 may include a user logging into a system that uses a token-based authentication system (TBAS), such as a SAP system. At step 34, method 40 may include the token-based authentication system (TBAS) adding the user token as a cookie. At step 36, method 40 may include the environment names being amended per the cookie (for example, amended to include the cookies). At step 38, method 40 may include directing the user to at least one windows-hosted application. At step 42, method 40 may include determining if the connection with the windows-hosted application is using a service account (for example, a windows Active Directory service account, as well as other types of service accounts). If the connection with the windows-hosted application is not using a service account, at step 44, method 40 may include continuing normal operations with the logged in user. For example, the user may continue to use applications that use a token-based authentication system (TBAS), but may require separate authentication for other services and/or applications.

Referring still to FIG. 3, if the connection with the windows-hosted application is using a service account, at step 46, method 40 may include a windows-hosted web application (WHWA) sending the cookie (that is, based on the user token issued by the TBAS, and/or the environment name) to a custom-built windows application. In some embodiments, the connection 33 between the service account and the windows-hosted web application may include a secure connection (such as a hypertext transfer protocol secure (HTTPS) connection as well as other types of secure connections). At step 48, method may include using a custom-built windows application to decode and validate the token and subsequently to save the validated token to a file. At step 50, (after decoding the token) method 40 may include the windows-hosted web application (WHWA) reading the generated file (that is, from the custom-build windows application) to determine the user ID. At step 52, method 40 may include the windows-hosted web application (WHWA) setting the identity of the request (for example, from the environment name of step 36) to the decoded user ID. At step 54, method 40 may include repeating steps 46-52, as needed, in order for the user to access other applications and hosts via similar methodologies.

Figure 4:
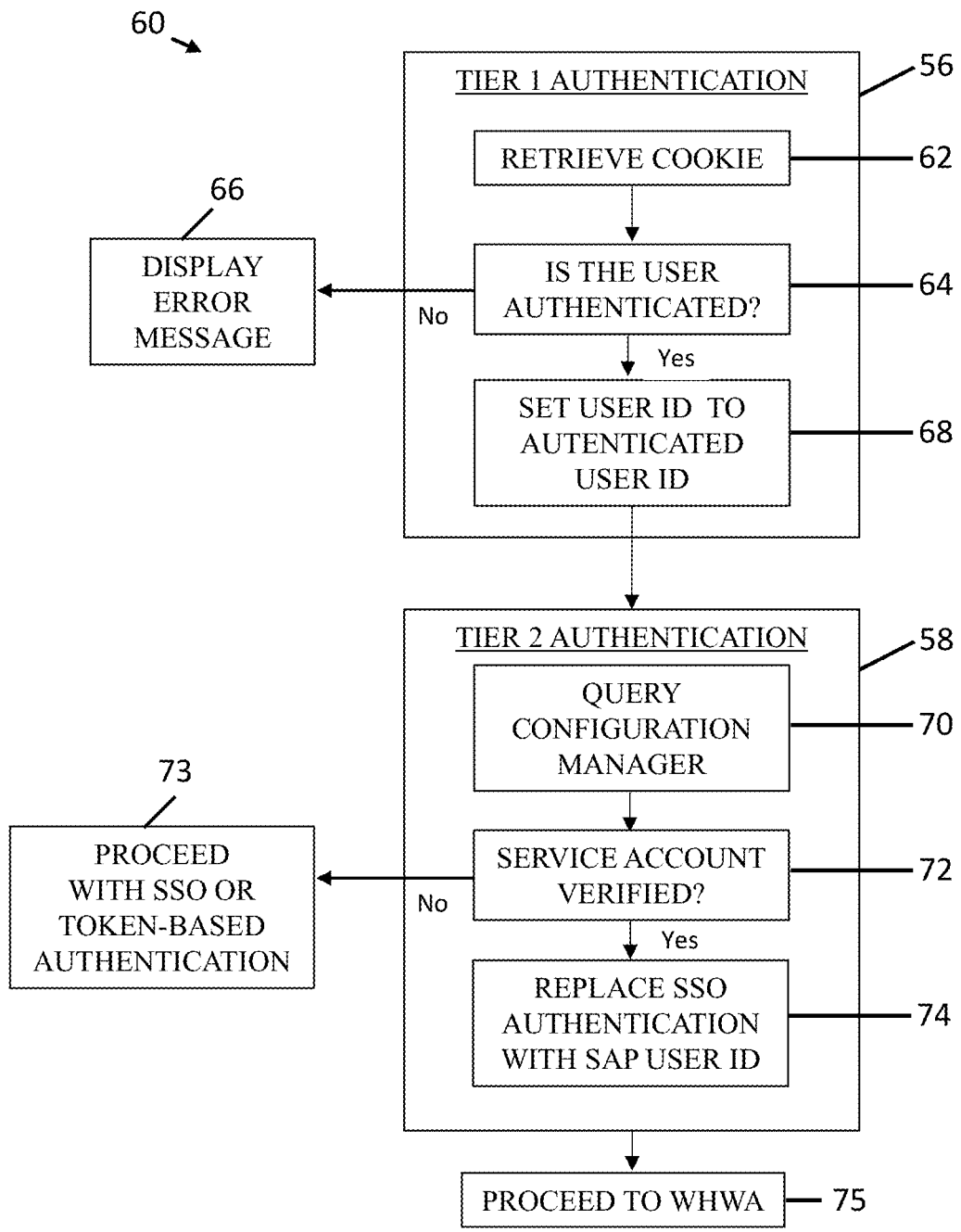
FIG. 4 illustrates a single sign-on method for token-based and web-based applications, according to aspects of the present disclosed embodiments.

FIG. 4 illustrates a method 60 highlighting how the windows authentication system determines if the connection to the windows-hosted web application is using a service account, according to aspects of the present disclosed embodiments. Method 60 highlighted in FIG. 4 may generally correspond to step 42 (that is, "is the connection using a service account?") of FIG. 3 and method 40. Method 60 may be implemented post-authentication, and may be called after the authentication is complete but before any services in the application (for example, windows-hosted web applications at step 46 of FIG. 3 and method 40) are called. The method 60 may generally include two levels or tiers of authentication, a tier 1 authentication 56 and a tier 2 authentication 58. At step 62, as part of the tier 1 authentication 56, method 60 may include retrieving the cookie (that is, the cookie based on the token from the token-based authentication system (TBAS)). At step 64, method 60 may include determining if the user is authenticated (for example, as per steps 32, 34, and 36 of FIG. 3 and method 40). At step 66, if the user is not authenticated, method 60 may include displaying an error message (for example, "authentication failed") and may include prompting the user for login credentials (that is, bringing the user back to the login process at step 32 of FIG. 3 and method 40). At step 68, if the user is authenticated, method 60 may include setting the user ID to an authenticated user ID (that is, based on the token or cookie).

Referring still to FIG. 4, at step 70, as part of the tier 2 authentication 58, the method 60 may include receiving the authenticated user ID from the tier 1 authentication 56, and then at step 70, querying a configuration manager for service account credentials. At step 72, the method 60 may include verifying if service account credentials are present. At step 73, if the service account is not verified, the method 60 may include proceeding with a normal authentication (for example, a token-based authentication or a conventional single sign-on authentication) and may include prompting the user for additional login credentials (for example, corresponding to step 44 of FIG. 3 and method 40). At step 74, if the service account is verified, the method 60 may include replacing the single sign-on (SSO) authentication credentials with an SAP user ID (for example, in embodiments that include logging into one or more SAP applications). In other embodiments, if the user logs into an SAP application first (for example, at step 32 of FIG. 3 and method 40) the method may include replacing the SAP credentials with authenticated SSO credentials. Stated otherwise, the present disclosed embodiments may be used to port an authentication from one platform to another regardless of which platform the user logs into first (for example, logging into an SAP application first or logging into a windows-based or web-based application first). In addition, the present disclosed embodiments may be used to port an authentication from one platform to another regardless of the type of authentication being used (for example, single sign-on (SSO) or token-based authentication). At step 75, the method 60 may include proceeding to the web-hosted windows application (per step 46 of FIG. 3 and method 40).

Figure 5:
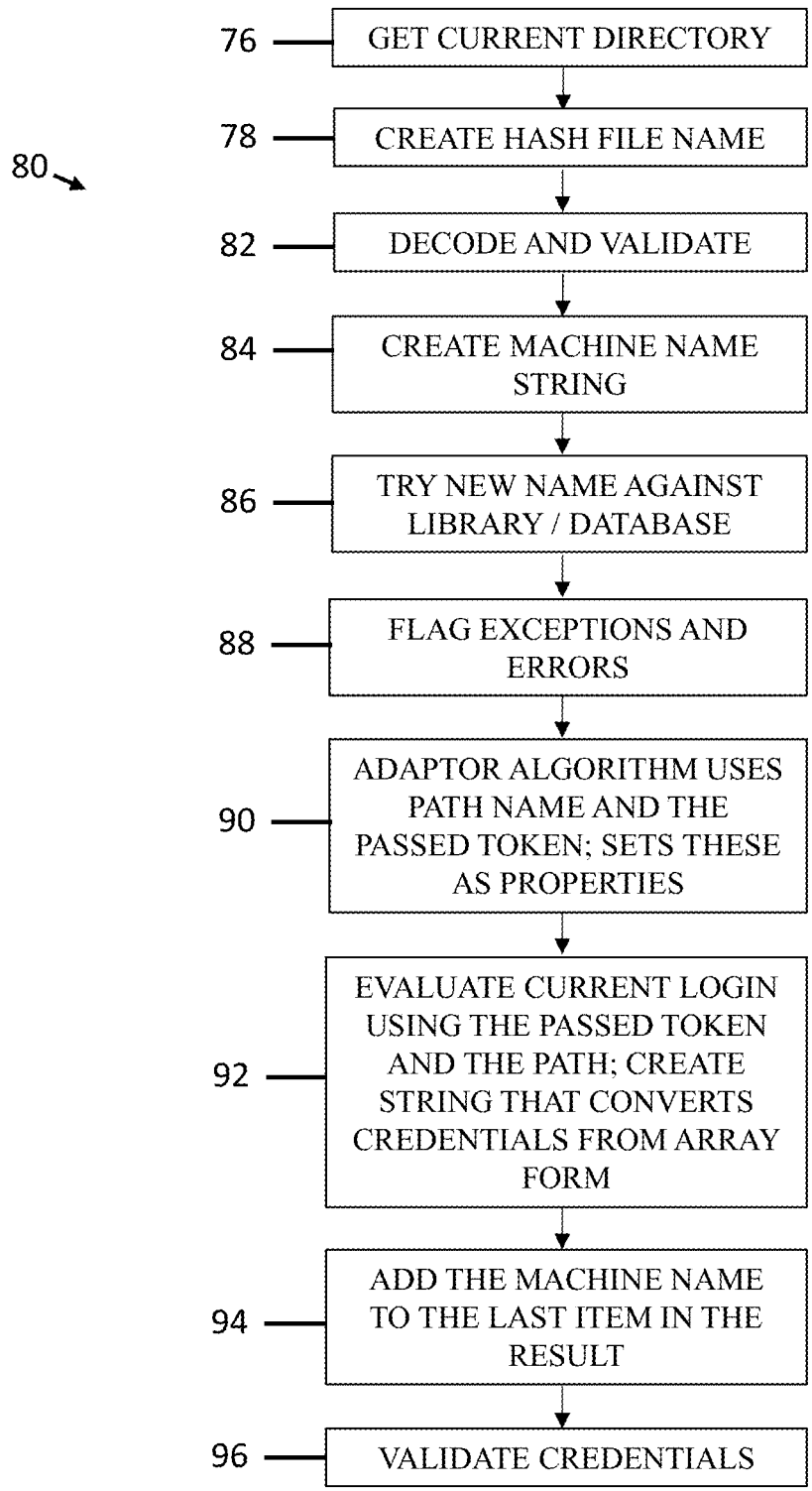
FIG. 5 illustrates a single sign-on method for token-based and web-based applications, according to aspects of the present disclosed embodiments.

FIG. 5 illustrates a method 80 highlighting how the windows application decodes and validates the token, according to aspects of the present disclosed embodiments. Method 80 highlighted in FIG. 5 may generally correspond to step 48 (that is, "custom-built windows application decodes and validates the token then saves it to a file") of FIG. 3 and method 40. At step 76, method 80 may include retrieving the current directory. The address of the current directory may be constructed using a combination of prior information (that is, preloaded into the windows-based web application) and received information (for example, information accompanying the passed token, or the passed token itself). The custom built windows application verifies that the passed token (that is, the received token) was issued by the passed environment certificate. As each TBAS-issued token is signed by the environment certificate, the certificate may be used to validate the token from the custom-built windows application. At step 78, method 80 may include creating a hash file name. At step 82 (which may include steps 84-96), method 80 may include decoding and validating the token. At step 84, method 60 may include creating a machine name string. At step 86, method 80 may include trying a new name against a library or database (for example, against a library or database of credentials from the token issuer). At step 88, method 80 may include flagging exceptions and errors. At step 90, method 80 may include an adaptor algorithm using the path name (for example, from step 86) and the token by setting these as properties of the updated credentials. At step 92, method 80 may include evaluating the current login using the passed token and the path, and creating a string that converts credentials from array form. At step 94, method may include adding the machine name to the last item in the result (for example, the array form step 92). Setting the machine name to the last item in the result may be used for log tracing. (For example, whatever the result is, add the machine name to it; this may be used to prevent raising exceptions). If the authentication has failed, the log may be kept until the configured-log "keep period" has expired. The text files may subsequently be deleted. At step 96, method 80 may include validating the new credentials. For example, validating the new credentials may include writing a new ticket path that includes the hash and indicates that the validation was successful.

Figure 6:
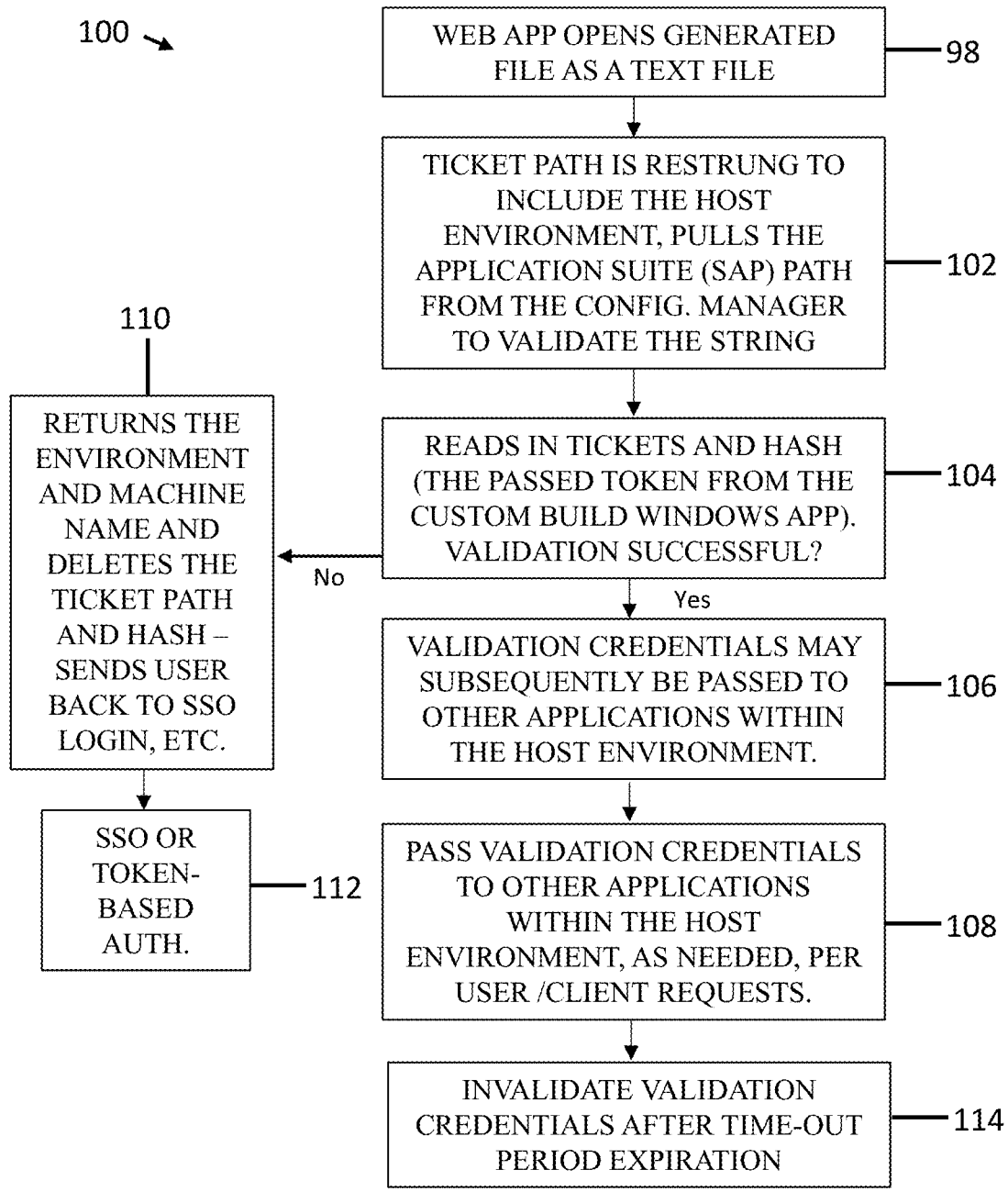
FIG. 6 illustrates a single sign-on method for token-based and web-based applications, according to aspects of the present disclosed embodiments.

FIG. 6 illustrates a method 100 highlighting how the web application reads the generated file from the custom-built windows application, according to aspects of the present disclosed embodiments. Method 100 highlighted in FIG. 6 may generally correspond to step 50 (that is, "after decoding, windows-hosted web application (WHWA) reads the generated file to determine the user ID") of FIG. 3 and method 40. After validating the token, the token may be decoded and the result may be saved in a text file. The windows-hosted web application (WHWA) may then read the newly created text file to get the result (that is, the decoded token). At step 98, method 100 may include the web application opening the generated file (that is, from the custom-built windows application) as a text file. At step 102, method 100 may include restringing the ticket path to include the host environment and pulling the application suite (for example, an SAP application suite) path from the configuration manager to validate the string. At step 104, method 100 may include reading in the tickets and hash (for example, the passed token from the custom built windows application). The name of the text file may use an MD5 hash of the token (as well as an MD2, MD4, MD6, FSB, HAS-160, and/or other hash functions). The name may be chosen based on both the environments and the custom-built windows application having this information beforehand. At step 104, method 100 may also include checking if the validation was successful.

Referring still to FIG. 6, at step 110, if the validation was not successful, the method 100 may include returning the environment and machine name and deleting the ticket path and hash, and then redirecting the user or client back to an SSO or token-based authentication (or login page, for example, at step 112 of the method 100). In addition, if the token has expired or is not valid, a message may be displayed to the user or client indicating that validation has failed and the user will not be able to access the second environment, which in this case may be the windows-hosted web application (WHWA), and/or secured services thereof. At step 106, if the validation at step 104 was successful, the method 100 may include passing the validation credentials to other applications within the host environment (for example, other SAP applications and/or other windows-based or web-based applications). At step 108, the method may include subsequently passing the validation credentials to other applications within the host environment, as needed, for example if the user or client requests access to other applications or services sometime after the initial request(s). At step 114, the method 100 may include invalidating the validation credentials after the expiration of a predetermined time-out period. In some embodiments, the time-out period may be from about fifteen (15) minutes to about twenty-four (24) hours, or from about twenty (20) minutes to about twelve (12) hours, or from about thirty (30) minutes to about eight (8) hours, or from about one (1) hour to about six (6) hours, as well as other subranges therebetween. In some embodiments, the time-out period may be greater than twenty-four (24) hours and may extend for multiple days, weeks, and/or months.

Figure 7:
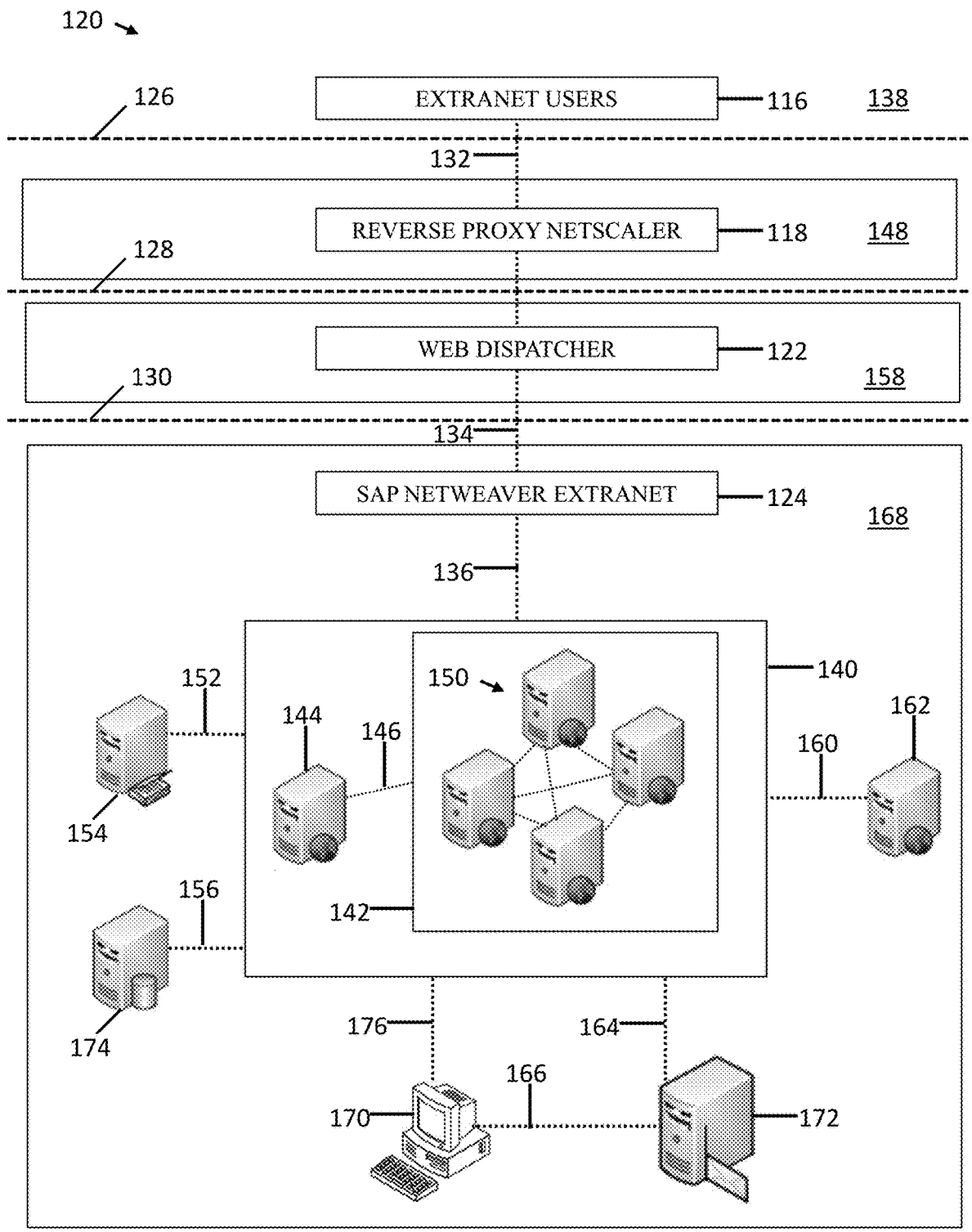
FIG. 7 illustrates a system architecture, according to aspects of the present disclosed embodiments.

FIG. 7 illustrates the architecture of a system 120 or ecosystem in which the methods 40, 60, 80 and 100 of FIGS. 3-6 may be employed, according to aspects of the present disclosed embodiments. In one embodiment, the system 120 may generally include four (4) levels, each level including a distinct function and level of security. At or within a first level 138, the system may include extranet users 116 and/or external web sites, web services, and/or web applications (for example, the world wide web). Stated otherwise, the first level 138 may include the external internet. The first level 138 may be connected to at least one component 118 (for example, a reverse proxy) within a second level 148. The second level 148 may be or include a first DMZ or demilitarized zone that is separated on either side by firewalls (for example, separated from the first zone 138 by a first firewall 126 and separated from a third zone 158 by a second firewall 128). The reverse proxy 118 (for example, a NetScaler reverse proxy) may be communicatively coupled to the extranet users and internal internet 116 via a hypertext transfer protocol secure (HTTPS) connection 132, and may be used to intercept user calls to external websites as an added level of security. The third zone 158 may be or include a second demilitarized zone (DMZ) and may include at least one web dispatcher 122, which may act as an interface between an intranet and an extranet and may be used to coordinate all web calls or requests to the external internet. The web dispatcher 122 may be communicatively coupled to the reverse proxy NetScaler 118.

Referring still to FIG. 7, the system 120 may also include a fourth level or zone 168 separated from the third zone 158 by a third firewall 130. The fourth level or zone 168 may include or be an intranet 168 comprising several components which may include (but are not limited to): an SAP NetWeaver extranet 124 (for example, an extranet portal 124), an SAP basis server 162, an exchange server 172, intranet users and clients 170, an Oracle database 174, an active directory authentication server 154, and an application-specific environment 140 which itself may include at least one application specific server 144, and as well as a web farm 142 including multiple windows internet information services (ITS) web servers 150. The application specific environment 140 may include, for example, flight production servers used for enterprise flight operations (for example, at an airline), client accounts used by a banking institution or other financial services enterprises, student data at educational institutions, weather data, geologic data, corporate tools (for example, engineering tools, payroll applications, and/or human resources tools used for tracking employee data), as well as other application-specific data and use cases. The application specific server 144 may be communicatively coupled to the web farm 142 via a second HTTPS connection 146 and each of the multiple windows IIS web servers 150 within the web farm 142 may also be coupled to one another. The active directory authentication server 154 may be used to authenticate users and may be communicatively coupled to the application specific environment 140 via a new technology LAN manager (NTLM) connection 152 which may be used to bolster the connection between the active directory authentication server 154 and the application specific environment 140.

Still referring to FIG. 7, the Oracle database 174 may be used to help coordinate transactions internal to the application specific environment 140 between components with different data structures and/or communications protocols (for example, between the web servers 150, the active directory authentication server 154 and the other servers within the intranet 168. The Oracle database 174 may be communicatively coupled to the application specific environment 140 via a secure sockets layer (SSL) connection 156 and/or a transport layer security (TLS) connection 156 in order to provide links that are both encrypted and authenticated between the various networks and servers within the intranet 168. The exchange server 172 may be communicatively coupled to the application specific environment 140 via a first simple mail transfer protocol (SMTP) connection 164 and may be communicatively coupled to intranet users 170 (and associated clients) via a second SMTP connection 166. The intranet users 170 may themselves be communicatively coupled to the application specific environment 140 via a third HTTPS connection 176. The SAP basis server 162, which may be used for installing, running, and/or administering the various SAP software within the intranet 168, may be communicatively coupled to the application-specific environment 140 via a fourth HTTPS connection 160.

Referring still to FIG. 7, in operation, in one or more embodiments of the system 120, authentication may be established between the web dispatcher 122 and the SAP NetWeaver extranet 124 (that is, the extranet portal 124) at a first interface connection 134 via 2-factor authentication over HTTPS. Authentication may also be established at a second interface connection 136 between the SAP NetWeaver extranet 124 and the application specific host environment 140 via basic authentication using a service account, in addition to SAP single sign-on (SSO) extension libraries, as described above and as illustrated in FIGS. 3-6. The requests from the SAP NetWeaver extranet 124 may be passed to one or more of the multiple windows IIS web servers 150 with an encrypted cookie that is verified within the web farm 142 (for example, by a SAP dynamic link library (DLL)) within the application-specific host environment 140. As such, the SAP NetWeaver extranet 124 (that is, the interface between the extranet 138 and the intranet 168) validates both internal intranet applications (including SAP and Oracle applications) as well as extranet applications (including web and windows-based applications), via a single user login or sign-in process. As such, applications hosted within the application-specific host environment 140 (for example, those that are hosted on SAP servers) can utilize existing windows-hosted web services (for example, those from the extranet 138). In one example, a user who logs into an SAP payroll application without the present disclosed embodiments cannot pull data from windows-hosted applications because the windows-hosted application cannot tell the identity of the user who has only logged into the SAP application. Thus, not only does the user have to login manually to the windows-hosted application, but the user may also have to port the data manually. By contrast, when using the present disclosed embodiments, the user who is logged into the SAP payroll application may access and directly pull data from the windows-hosted applications by automatically being logged-in to, and authenticated by, the windows-hosted application as described above.

The authentication methods 40, 60, 80, 100, and system 120 of the present disclosed embodiments may be used to authenticate users between platforms. Existing systems only provide authentication mechanisms between windows desktop solutions (SAP GUI) and SAP Net weaver Server. However, using the systems and methods of the present disclosed embodiments, any system that uses token-based authentication may be used and/or leveraged, thereby allowing the tokens to be decrypted by desktop applications, without requiring invention and/or a separate login by the user. By using a web request rather than a client server authentication, the systems and methods of the present disclosed embodiments include single sign-on capabilities between, for example, SAP NetWeaver Servers (which use token-based authentication) and windows-hosted web applications. Other existing solutions focus on authentication at the network level and not at the application level. As such, the present disclosed embodiments are capable of performing web-to-web authentication between SAP-hosted applications (which use token-based authentications) and non-SAP web solutions. By contrast, existing market solutions are limited only to windows desktop applications.

According to some aspects, the present disclosed embodiments may include applications that are hosted on SAP servers and/or windows servers. In one embodiment, a SAP-hosted application passes the authentication token and the environment name. Another embodiment may include a mobile-friendly web application that is hosted on SAP with the backend services hosted on windows servers that utilize existing services and leverage existing tools and systems. In other embodiments, when applications (for example, SAP-hosted applications) are moved to the extranet, an interface on SAP may be created to utilize windows-hosted web services (for example, with the front-end interface hosted on SAP, and the backend hosted on windows).

The present disclosed embodiments may be used to aid in the seamless integration of windows-hosted web applications with SAP systems by not requiring the user to have to login multiple times, and by allowing for the porting of data between systems, thereby eliminating the need to manually port data back and forth between different systems and host environments or platforms. Currently, more and more companies are adapting SAP systems. By enabling web applications that are currently hosted on windows environments to identify authenticated users coming from SAP environments, the present disclosed systems and methods help to integrate web applications with SAP solutions. The present disclosed embodiments may be used in any situation in which a user is authenticated through one environment and tries to access another one without having to be re-authenticated, even when the two environments use different authentication types. By allowing users to gain access to multiple interfaces and/or platform types via a single authentication step, users can read and send requests to and within the second environment of hosted services.

All or part of the system and processes described in this specification and their various modifications (subsequently referred to as "the processes") may be controlled at least in part by one or more computing systems using one or more computer programs, which may include Java, C# and other languages which may be hosted in a .net framework, among other frameworks. Examples of computing systems include, either alone or in combination, one or more desktop computers, laptop computers, servers, server farms, and mobile computing devices such as smartphones, feature phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an application-specific integrated circuit (ASIC), or both. All or part of the systems may also be implemented as special purpose logic circuitry, for example, a specially designed (or configured) central processing unit (CPU), conventional central processing units (CPU) a graphics processing unit (GPU), and/or a tensor processing unit (TPU).

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, CD-ROMs (compact disk-read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Each computing device may include a graphics system, including a display screen. A display screen, such as a liquid crystal display (LCD) or a CRT (Cathode Ray Tube) displays to a user images that are generated by the graphics system of the computing device. One or more displays or images on a computer display (for example, a monitor) physically transform the computer display. For example, if the computer display is LCD-based, the orientation of liquid crystals may be changed by the application of biasing voltages in a physical transformation that is visually apparent to the user. As another example, if the computer display is a CRT, the state of a fluorescent screen may be changed by the impact of electrons in a physical transformation that is also visually apparent. Each display screen may be touch sensitive, allowing a user to enter the information onto the display screen via a virtual keyboard. On some computing devices, such as a desktop computer or a smartphone, a physical QWERTY keyboard or Arabic keyboard and scroll wheel may be provided for entering information onto the display screen.

Each computing device, and computer programs executed on each computing device, may also be configured to accept voice commands, and may be configured to perform functions in response to such commands. For example, the process described in this specification may be initiated at a client, to the extent possible, via voice commands.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

Certain Definitions

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:
    logging, by a user using a software application, into a first token-based authentication system (TBAS) by sending login credentials to an authorization server,
    wherein the authorization server sends a token to the software application in response to verifying the login credentials;
    creating, at the TBAS and in response to the user logging into the TBAS, a cookie based on the token;
    requesting access, by the user using a web-based application, to a second system with an authentication method that is different from a token-based authentication method,
    wherein the web-based application sends the cookie to a web server communicatively coupled to the second system;
    granting, in response to the web server validating the cookie, access to the second system based only on the user logging into the first token-based authentication system; and
    pulling, by the software application into the TBAS, data from the second system using the web-based application and the cookie.

2. The method of claim 1, wherein the web-based application sends the cookie to a second web application hosted on the second system.

3. The method of claim 2,
    wherein the second web application saves the token as a text file.

4. The method of claim 3, further comprising determining if the user is authenticated, wherein the web-based application reads the text file to determine an identity of the user.

5. The method of claim 4, further comprising invalidating the token after the expiration of a predetermined time-out period,
    wherein if the user is authenticated, the method further comprises:
    setting, at the first authentication tier, the identity of the user to an authenticated identify of the user using the cookie;
    receiving, at the second authentication tier, the authenticated identity of the user from the first authentication tier; and
    querying, by the second authentication tier, a configuration manager for service account credentials.

6. The method of claim 1,
    wherein the web-based application sets an identity of the request resulting from requesting access, by the user, to the second system, to the identity of the user, and
    wherein if the user is not authenticated, the method further comprises prompting the user for login credentials for the TBAS.

7. The method of claim 1, further comprising determining if a connection between the TBAS and the web-based application is using the service account.

8. The method of claim 7, wherein determining if a connection between the TBAS and the web-based application is using the service account further comprises querying a configuration manager for service account credentials.

9. The method of claim 1, further comprising:
    retrieving an address of the current directory;
    creating at least one hash file name;
    creating a machine name string; and
    checking the machine name string against a library of credentials from the TBAS.

10. The method of claim 1, wherein the software application is a payroll application.

* * * * *